March 29, 1960 W. HERTERICH 2,930,282
EXPOSURE METERING DEVICE
Filed April 5, 1955 2 Sheets-Sheet 1
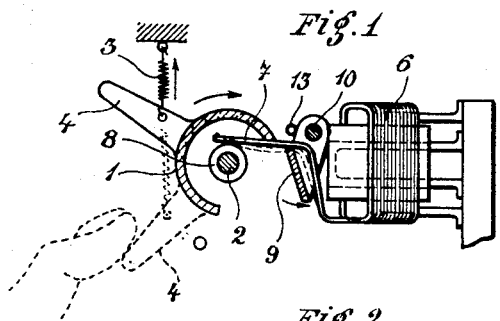
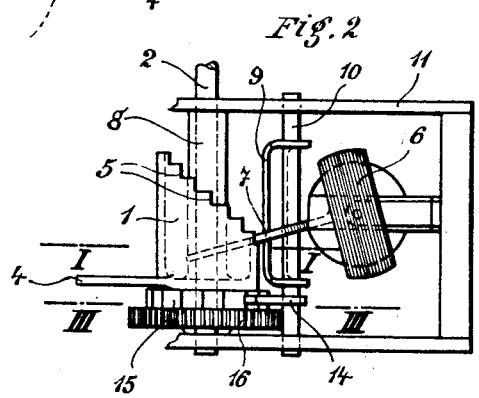
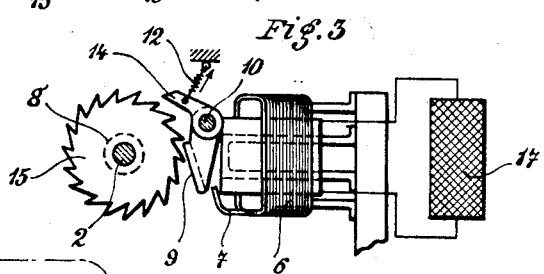
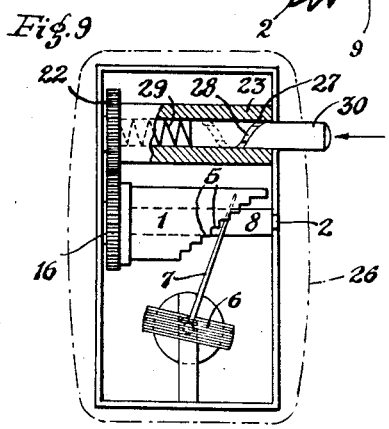
INVENTOR.
WALTER HERTERICH
BY K. A. Mayr March 29, 1960
W. HERTERICH
2,930,282
EXPOSURE METERING DEVICE
Filed April 5, 1955
2 Sheets-Sheet 2
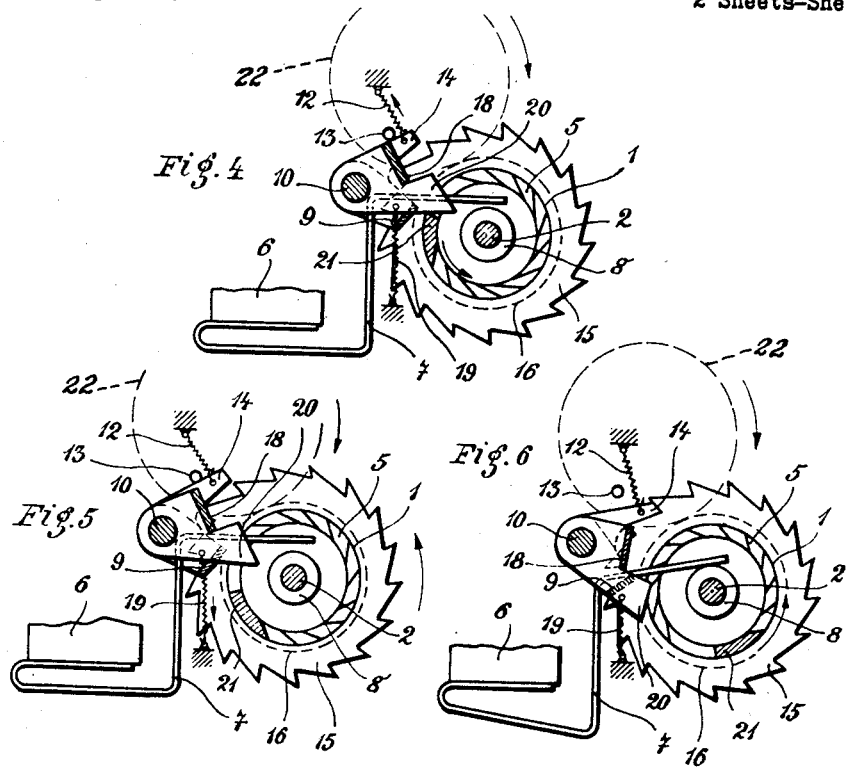
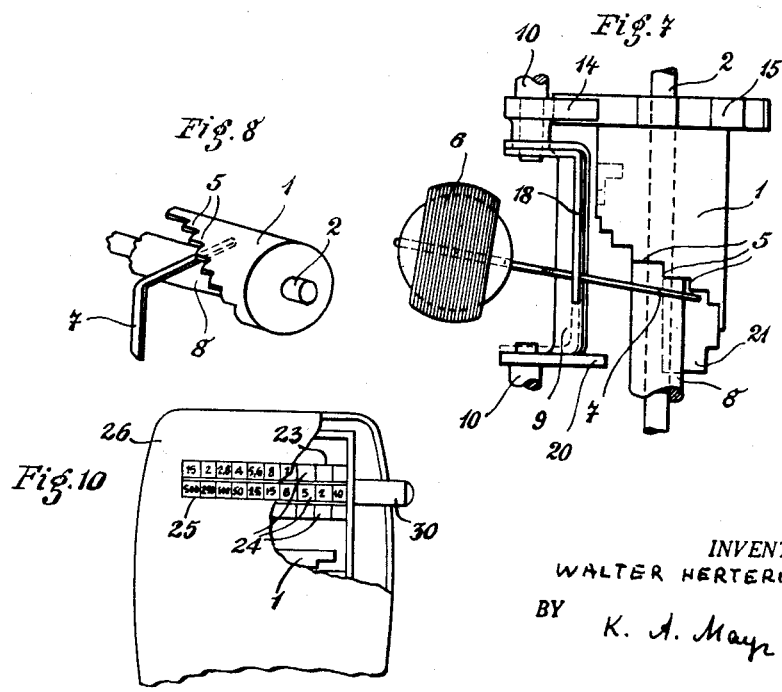
INVENTOR.
WALTER HERTERICH
BY K. A. Mayr

United States Patent Office 2,930,282
Patented Mar. 29, 1960

2,930,282

EXPOSURE METERING DEVICE

Walter Herterich, Dachau, Germany

Application April 5, 1955, Serial No. 499,429

11 Claims. (Cl. 88—23)

The present invention relates to an exposure metering device particularly for photographic work.

For devices regulating the exposure for cameras it is known to employ the pointer of a moving coil system as a stop for a toothed scanning element which is operable from the outside of the device and which controls an element affecting the exposure or an element indicating the time of exposure.

The invention relates to exposure meters, which can be used per se or adapted to be used in combination with cameras, measuring instruments, control instruments etc. The device according to the invention is characterized by a rotatable hollow cylinder provided with a plurality of steps in the manner of a winding stairway, the pointer of a moving coil system, energized by a photoelectric cell, extending into the interior of the hollow cylinder and into the path of the steps for arresting rotation of the cylinder. Spring actuated means are provided for rotating the stepped portion of the cylinder toward the pointer which means are adapted to be tensioned and to be released by the hand of the operator. An additional feature of the invention is that the hollow cylinder, after performing its partial rotation dependent upon the angle of deflection of the pointer, is locked in position by a pawl which is controlled by the pointer, so that overstressing of the pointer is avoided.

The hollow cylinder which is rotated by the action of a spring affords transmission of its rotary movement to the scales of an exposure meter, or to the regulating means for the diaphragm and for the time of exposure of a camera, or to some other measuring or control device.

Additional features and advantages of the invention will be understood from a consideration of the following detailed description taken in connection with the accompanying drawings, forming a part of this specification and in which several embodiments of the invention have been shown by way of example. However, I wish to say that the invention is not confined to any strict conformity with the showing of the drawings, but may be changed or modified, so long as such changes or modifications mark no material departure from the salient features of the invention as expressed in the appended claims.

In the drawings—

Fig. 1 is a diagrammatic sectional view of a mechanism according to the invention suitable for actuating an exposure meter, the section being taken on line I—I in Fig. 2;

Fig. 2 is a top-view of the mechanism shown in Fig. 1;

Fig. 3 is a cross-section on line III—III of Fig. 2;

Figs. 4 to 7 are cross-sectional views showing, in different positions, a modified mechanism provided with additional safeguarding means for the pointer of the moving coil system;

Fig. 8 is a perspective illustration of a detail of the device shown in Figs. 4 to 7;

Figs. 9 and 10 are front views with parts broken away of a modified device in combination with an exposure meter.

Like parts are designated by like numerals in different figures of the drawing.

Referring to the drawings, the reference numeral 1 designates a hollow cylinder, which is rigidly connected to a rotatable shaft 2 and actuated by a spring 3 which is connected to a tensioning lever 4 extending from the cylinder 1 and adapted to be manipulated by the operator for tensioning the spring 3 and releasing it for effecting the measuring operation. Milled into the hollow cylinder 1 in spiral-like fashion is a row of teeth or steps 5 (see Fig. 2). The hollow cylinder 1 is arranged adjacent to a moving coil system 6 in such manner that the pointer 7 of the moving coil system is enabled to move freely within the hollow cylinder 1 along the nave 8 of the cylinder. The pointer 7 pivots about an axis located in a plane generally perpendicular to the axis of revolution of the cylinder member 1. The pointer moves in a plane generally parallel to this axis of revolution, and the steps of the cylinder member 1 each include a portion extending generally parallel to the rotational axis of the cylinder but each such step portion has a different axial position therealong as well as being spaced angularly about this axis relative each of the other step portions. In progressing along the axis of the cylinder, the steps are displaced at progressively different angles about said axis so that the pointer 7 will permit maximum rotation of the cylinder 1 when it engages the step at one end thereof and the amount of cylinder rotation permitted before the succeeding steps engage the pointer is progressively reduced toward the other end of the cylinder.

Positioned beneath the pointer 7 is a bow 9 extending over the range of deflection of the pointer 7 (see Fig. 2). The bow 9 is rigidly secured to a shaft 10, which is rotatably supported in a stationary frame 11 of the device. Rotation of the bow 9 is limited by a stop 13.

Keyed onto the shaft 10 is a pawl 14, which is acted on by a spring 12 and adapted for cooperation with a ratchet wheel 15 which at one end of the hollow cylinder 1 is mounted on the shaft 2 of the latter. Mounted on the shaft 2, is a gear wheel 16 (see Fig. 2), by means of which the partial rotary movement of the hollow cylinder 1 which movement is limited by the pointer 7 is transmitted to a gear wheel meshed with gear wheel 16 and connected to the setting means affecting the exposure of the camera etc. (not illustrated).

The device operates as follows: After exposure of a photoelectric cell 17, the pointer 7 takes up the position illustrated in Fig. 2.

At the beginning of the measuring operation the pretensioned spring 3 is released by the operator, rotating the cylinder 1 in clockwise direction until a tooth of the row of teeth 5 of the hollow cylinder 1 abuts against the pointer 7. This position is illustrated in Fig. 1. In this position the free end of the pointer 7 rests against the nave 8 of the hollow cylinder 1 and is safeguarded against undue bending by said nave 8 and by the locking means 9, 14, 15, a slight bending of the pointer causing abutment of the pointer against the bow 9. Simultaneously the bow 9 is slightly rotated in counterclockwise direction with the result that the pawl 14 engages in the ratched wheel 15, locking thereby the shaft 2 in its respective position and preventing thereby an overstressing of the pointer 7.

Rotation of the hollow cylinder 1 by the finger of the operator against the resistance of the spring 3 causes the hollow cylinder to return to its initial position, and simultaneously releases the pointer 7.

The pointer may be provided with additional safeguarding means, which are illustrated on an enlarged scale in Figs. 4 to 8.

It may happen that the pointer 7 during its free and unhindered movement adjusts itself in such a way that step 5 comes to rest with its edge upon the pointer 7 or upon an edge of the latter in such manner that the pointer is thereby caused to slip off the step by which it was to be locked in position and thus is displaced in lateral direction, maybe over the entire number of steps. A situation like this is shown in Fig. 8, and it is obvious that, with the pointer in this position, the orderly functioning of the pointer and the correct indication of a value is doubtful and uncertain.

Although a situation like this may not occur very often, the invention provides for the pointer a special brake, consisting of a brake-bow 18 which, together with the locking-bow 9, is supported by pins 10' and 10" to rotate on the same axis of rotation and which extends over the range of deflection of the pointer. This arrangement is shown in the top-view illustrated in Fig. 7. The brake-bow 18 is acted on by a tension spring 19 and is pressed, when the device is not used, by means of an augular extension 20 against an extension 21 of the cylinder 1. This is illustrated in Fig. 4, in which the brake-bow 18 is positioned at a slight distance from the pointer 7 in order not to interfere in any way with the free play of the latter.

This brake-bow for the pointer operates as follows: When the cylinder 1 is under spring action, that is to say, when it is wound up, the pointer 7 is not acted on either by the brake-bow 18 or by the locking-bow 9, so that it can adjust itself freely in conformity with the action of the moving coil system. When, thereupon, the cylinder 1 is released, it rotates in counter-clockwise direction, and at the beginning of the adjusting movement the brake-bow 18 comes to rest upon the pointer 7 and secures the latter in its adjusted position, so that self-shifting of the pointer is reliably prevented even if the pointer were to take up a position as illustrated in Fig. 8. Naturally, the friction between the bow 18 and the pointer 7 is so slight that no injuring or bending of the pointer can occur. This position is shown in Fig. 5.

When a step 5 of the rotating hollow cylinder 1 abuts against the pointer end of the latter, as already described, comes to rest upon the nave 8 of the hollow cylinder 1 and upon the locking bow 9, which then performs a slight rotational movement in clockwise direction, effecting engagement of the pawl 14 in the ratchet wheel 15. This position is shown in Fig. 6.

The tension spring 19 acting upon the brake-bow 18 is, in conformity with the function which it has to perform, slightly less powerful than the spring 12 acting upon the locking-bow 9.

Upon rotation of the hollow cylinder 1 against the action of the spring 3, not shown in Figs. 4 to 7, into the dotted line position in Fig. 1, both bows 9 and 18 are returned to starting position and the pointer 7 whereby the latter is released to assume the position determined by the energization of the coil system 6.

The pointer 7 passes through the following succession of operating stages: Before the beginning of the measuring, that is to say, in pre-tensioned condition of the spring 3 the pointer 7 is free for unrestricted movement, whereupon it is first braked by the brake-bow 18, then locked up by the locking bow 9 abutting against the pointer.

Figs. 9 and 10 show how a mechanism according to the invention may be arranged in an exposure meter.

The construction of the hollow cylinder 1 and the moving coil system 6 corresponds to that shown in Figs. 1 to 3.

A gear wheel 16 mounted on the cylinder shaft 2 is caused to perform a partial rotation by a second gear wheel 22 which is rigidly secured to an externally graduated hollow drum 23. The latter is provided on its circumference with scales 24 customary for exposure meters. The scales 24 appear in a window 25 of the casing 26. The drum 23 is provided with a pin 27, projecting into the interior of the drum 23 and into a helical groove or worm path 28 on a pin 30 axially movable in the bore of the drum 23. The pin is urged out of the drum 23 by a spring 29. The free end of the bolt 30 projects from the drum and can be pushed inwardly by the finger, whereby the drum 23 is caused to make at the most one turn. The rotation of the drum 23 is transmitted via the gears 22, 16 to the hollow cylinder 1, and the latter is thereby returned to starting position. Rotation of the pin 30 is prevented by conventional means, not shown.

The operation of the exposure meter is remarkably simple.

After the bolt 30 has been pushed into the bore of the drum 23 and released, the hollow cylinder 1 is rotated via the gears 22, 16 until a step abuts against the pointer 7 adjusted by the moving coil system 6 in conformity with the existing degree of illumination, whereupon the scale 24 appearing in the window 25 indicates the required time of exposure.

Whereas a simplified mechanism according to the invention has been illustrated as used in an exposure meter, it is obvious that the modifications of the mechanism shown in Figs. 1 to 3 and 4 to 7 can likewise be adapted to be used in an exposure meter.

What I claim as new and desire to secure by Letters Patent of the United States is:

1. An exposure metering device comprising light-sensitive means including a pointer, a member having a plurality of steps and rotatable about a predetermined axis, each of said steps being spaced from said axis and having a portion extending generally parallel thereto for engagement with said pointer to block rotation of said member in one direction about said axis, said pointer being swingable on an axis located in a plane substantially at a right angle to said predetermined axis, said pointer extending near said rotational member so as to be swingable into a path of movement of each of said step portions when they are rotated about said predetermined axis, said step portions each having a different position axially of said predetermined axis and each said step portion being spaced angularly about said predetermined axis relative to the other step portions, and spring-actuated means connected with said member for rotating it to move said steps in said one direction toward said pointer until one of said steps abuts said pointer.

2. A device as defined in claim 1 in which there is provided means disposed along the path of movement of said pointer and located within the paths of revolution defined by said step portions for engagement and support of said pointer when the latter is pressed thereagainst upon abutment of one of said step portions against said pointer.

3. In an exposure metering device a mechanism comprising a hollow cylinder rotatable on its longitudinal axis and having a portion provided with a plurality of steps, light sensitive means including a pointer swingable on an axis which is located in a plane substantially at a right angle to the rotation axis of said cylinder, said pointer extending into said cylinder and into the path of said steps, each of the said steps having a portion generally parallel to the axis of rotation of said cylinder and engageable with said pointer for blocking rotation of said cylinder in one direction, each of said step portions having a different position axially of said cylinder and each said step portion being spaced angularly about said axis relative the other step portions, and spring-actuated means operatively associated with said cylinder for rotating said cylinder to move said steps in said one direction toward said pointer until one of said steps abuts against said pointer.

4. The mechanism defined in claim 3 including stop means including first means connected with said cylinder, second means adapted to be engaged and moved by said pointer and adapted to engage said first means for arresting rotation of said cylinder upon abutment of one of said steps against said pointer.

5. The mechanism according to claim 4 in which said first means are constituted by a ratchet wheel coaxially connected with said hollow cylinder, in which said second means are constituted by a member swingably supported to swing on an axis parallel to the rotation axis of said cylinder and having an edge portion which is parallel to the plane in which said pointer is swingable and which is adapted to be engaged by said pointer, and in which a pawl is rigidly connected with said member and adapted to engage said ratchet wheel in response to movement of said edge portion upon engagement therewith of said pointer.

6. The mechanism defined in claim 3 in which said hollow cylinder is provided with a nave having a cylindrical surface and in which said pointer tangentially abuts said surface upon abutment of one of said steps against said pointer.

7. In an exposure metering device a mechanism including a first gear wheel, a second gear wheel in mesh with said first gear wheel, a hollow cylinder having one end rigidly and coaxially mounted on said second gear wheel, said cylinder being provided with a plurality of steps, a light sensitive device including a pointer swingable on an axis which is located in a plane substantially at a right angle to the rotation axis of said cylinder and extending into said cylinder and into the path of said steps, each of the said steps having a portion generally parallel to the axis of rotation of said cylinder and engageable with said pointer for blocking rotation of said cylinder in one direction, each of said step portions having a different position axially of said cylinder and each said step portion being spaced angularly about said axis relative the other step portions, spring actuated means connected with one of said gear wheels for rotating said cylinder to move said steps toward said pointer, and means connected with one of said gear wheels for manually rotating said gear wheels against the action of said spring actuated means.

8. In an exposure metering device a mechanism comprising a hollow cylinder rotatable on its longitudinal axis and having a portion provided with a plurality of steps, light sensitive means including a pointer swingable on an axis which is located in a plane substantially at a right angle with respect to the rotation axis of said cylinder, said pointer extending into said cylinder and into the path of said steps, each of the said steps having a portion generally parallel to the axis of rotation of said cylinder and engageable with said pointer for blocking rotation of said cylinder in one direction, each of said step portions having a different position axially of said cylinder and each said step portion being spaced angularly about said axis relative the other step portions, spring actuated means operatively associated with said cylinder for rotating said cylinder to move said steps in a direction toward said pointer until one of said steps abuts against said pointer; stop means including a ratchet wheel coaxially connected with said cylinder, a member swingably supported to swing on an axis parallel to the rotation axis of said cylinder and having an edge portion which is located substantially at a right angle to the swing axis of said pointer and which is adapted to be engaged by said pointer, and a pawl rigidly connected with said member and adapted to engage and block said ratchet wheel when said pointer is pressed against said edge portion by a step of said cylinder; and brake means for said pointer, said brake means including a brake member swingably supported to swing on the same axis as said member of said stop means and having an edge portion parallel to the edge portion of said member of said stop means, a spring connected with said brake member for urging the edge portion of said brake member against said pointer, said hollow cylinder having an extension, and said brake member having an angular extension adapted to be abutted by the extension on said cylinder for moving said brake member away from said pointer against the action of said spring when said cylinder is rotated to move said steps away from said pointer.

9. The mechanism defined in claim 8 in which said pointer is placed between said edge portions of said member of said stop means and of said brake member.

10. An exposure metering device including a first gear wheel, a second gear wheel in mesh with said first gear wheel, a hollow cylinder having one end rigidly and coaxially mounted on said second gear wheel, said cylinder being provided with a plurality of steps, a light sensitive device including a pointer swingable on an axis which is located in a plane substantially at a right angle to the rotation axis of said cylinder and extending into said cylinder and into the path of said steps, each of the said steps having a portion generally parallel to the axis of rotation of said cylinder and engageable with said pointer for blocking rotation of said cylinder in one direction, each of said step portions having a different position axially of said cylinder and each said step portion being spaced angularly about said axis relative the other step portions, spring-actuated means connected with one of said gear wheels for rotating said cylinder to move said steps toward said pointer, actuating means connected with one of said gear wheels for manually rotating said gear wheels against the action of said spring-actuated means, a drum coaxially and rigidly connected with said first gear wheel, a casing enveloping all aforementioned elements, said actuating means projecting from said casing, a window in said casing adjacent to said drum, and a scale on the outside of said drum and being readable, in part, through said window.

11. An exposure metering device including a first gear wheel, a second gear wheel in mesh with said first gear wheel, a hollow cylinder having one end rigidly and coaxially mounted on said second gear wheel, said cylinder being provided with a plurality of steps, a light sensitive device including a pointer swingable on an axis which is located in a plane substantially at a right angle to the rotation axis of said cylinder and extending into said cylinder and into the path of said steps, each of the said steps having a portion generally parallel to the axis of rotation of said cylinder and engageable with said pointer for blocking rotation of said cylinder in one direction, each of said step portions having a different position axially of said cylinder and each said step portion being spaced angularly about said axis relative the other step portions, a hollow drum coaxially and rigidly connected with said first gear wheel, a first pin axially slidably inserted in said drum, a spring connected with said pin for urging said pin out of said drum, a helical groove on said pin, a second pin connected with and projecting into the interior of said drum and extending into said groove for rotating said drum upon axial movement of said first pin in said drum, a casing enveloping all aforementioned elements, said first pin being adapted to project from said casing, a window in said casing adjacent to said drum, and a scale on the outside of said drum and being readable, in part, through said window.

References Cited in the file of this patent

UNITED STATES PATENTS

| | | |
|---|---|---|
| 2,058,531 | Tuttle | Oct. 27, 1936 |
| 2,148,963 | Rauch | Feb. 28, 1939 |
| 2,150,365 | Dziewior | Mar. 14, 1939 |
| 2,253,055 | Tuttle et al. | Aug. 19, 1941 |
| 2,282,659 | Kun | May 12, 1942 |
| 2,325,463 | Axler et al. | July 27, 1943 |
| 2,532,417 | Norman | Dec. 5, 1950 |
| 2,576,813 | Simons | Nov. 27, 1951 |
| 2,584,440 | Fogle | Feb. 5, 1952 |
| 2,706,428 | Pfaffenberger et al. | Apr. 19, 1955 |

FOREIGN PATENTS

| | | |
|---|---|---|
| 802,940 | France | Sept. 18, 1936 |
| 1,029,569 | France | Mar. 11, 1953 |